(12) United States Patent
Lee et al.

(10) Patent No.: US 9,214,705 B2
(45) Date of Patent: Dec. 15, 2015

(54) BATTERY CELL OF IMPROVED COOLING EFFICIENCY

(71) Applicant: LG CHEM, LTD., Seoul (KR)

(72) Inventors: Jae Hyun Lee, Daejeon (KR); Seunghyun Chung, Daejeon (KR); Geun Chang Chung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/540,799

(22) Filed: Nov. 13, 2014

(65) Prior Publication Data

US 2015/0072191 A1      Mar. 12, 2015

Related U.S. Application Data

(63) Continuation of application No. PCT/KR2013/005163, filed on Jun. 12, 2013.

(30) Foreign Application Priority Data

Jun. 12, 2012    (KR) .................. 10-2012-0062397

(51) Int. Cl.
*H01M 10/6554*    (2014.01)
*H01M 2/02*    (2006.01)
(Continued)

(52) U.S. Cl.
CPC ......... *H01M 10/5053* (2013.01); *B60L 3/0046* (2013.01); *B60L 3/0069* (2013.01); *B60L 11/1868* (2013.01); *B60L 11/1874* (2013.01); *B60L 11/1879* (2013.01); *B60L 11/1892* (2013.01); *H01M 2/024* (2013.01); *H01M 10/0431* (2013.01); *H01M 10/5016* (2013.01); *H01M 10/625* (2013.01); *H01M 10/654* (2013.01); *H01M 10/6554* (2013.01); *H01M 10/6556* (2013.01); *B60L 2240/545* (2013.01);
(Continued)

(58) Field of Classification Search
None
See application file for complete search history.

(56) References Cited

U.S. PATENT DOCUMENTS

2003/0013012 A1*  1/2003  Ahn et al. .................. 429/152
2003/0017383 A1*  1/2003  Ura et al. .................. 429/120
(Continued)

FOREIGN PATENT DOCUMENTS

DE    10 2010 021 908 A1    12/2011
KR    10-2011-0030225 A     3/2011
(Continued)

OTHER PUBLICATIONS

International Search Report issued in PCT/KR2013/005163, mailed on Aug. 13, 2013.

(Continued)

*Primary Examiner* — Ula C Ruddock
*Assistant Examiner* — Matthew Van Oudenaren
(74) *Attorney, Agent, or Firm* — Birch, Stewart, Kolasch & Birch, LLP

(57) ABSTRACT

Disclosed herein is a battery cell configured such that at least one electrode assembly of a structure having a cathode, an anode, and a separator interposed between the cathode and the anode is mounted in a battery case, at least one heat dissipation member to dissipate heat generated in the electrode assembly during charge and discharge of the battery cell or upon occurrence of a short circuit is disposed in the electrode assembly and/or is in contact with an outer surface of the electrode assembly, and a portion of the heat dissipation member is exposed outward from the electrode assembly.

13 Claims, 6 Drawing Sheets

(51) Int. Cl.

| | | |
|---|---|---|
| *H01M 10/625* | (2014.01) | |
| *H01M 10/04* | (2006.01) | |
| *B60L 3/00* | (2006.01) | |
| *B60L 11/18* | (2006.01) | |
| *H01M 10/654* | (2014.01) | |
| *H01M 10/6556* | (2014.01) | |
| *H01M 10/613* | (2014.01) | |
| *H01M 10/65* | (2014.01) | |
| *H01M 10/6555* | (2014.01) | |
| *H01M 10/647* | (2014.01) | |
| *H01M 10/60* | (2014.01) | |
| *H01M 10/61* | (2014.01) | |
| *H01M 10/653* | (2014.01) | |

(52) U.S. Cl.
CPC ...... *B60L 2240/547* (2013.01); *B60L 2240/549* (2013.01); *H01M 10/60* (2015.04); *H01M 10/61* (2015.04); *H01M 10/613* (2015.04); *H01M 10/647* (2015.04); *H01M 10/65* (2015.04); *H01M 10/653* (2013.01); *H01M 10/6555* (2015.04); *H01M 2220/20* (2013.01); *Y02T 10/7005* (2013.01); *Y02T 10/705* (2013.01)

(56) References Cited

U.S. PATENT DOCUMENTS

| | | |
|---|---|---|
| 2005/0202311 A1* | 9/2005 | Higashino et al. .............. 429/99 |
| 2006/0063067 A1* | 3/2006 | Kim .............................. 429/148 |
| 2006/0216582 A1* | 9/2006 | Lee et al. ............ H01M 2/1077 429/120 |
| 2009/0023057 A1* | 1/2009 | Kim .................... H01M 2/0207 429/120 |
| 2011/0256436 A1* | 10/2011 | Eo .................................. 429/94 |
| 2012/0094166 A1* | 4/2012 | Lee et al. ............. B60L 11/1874 429/120 |
| 2012/0177965 A1 | 7/2012 | Lee et al. |
| 2013/0045410 A1 | 2/2013 | Yang et al. |
| 2013/0164594 A1* | 6/2013 | Zahn .................... H01M 2/021 429/120 |

FOREIGN PATENT DOCUMENTS

| | | |
|---|---|---|
| KR | 10-2011-0063007 A | 6/2011 |
| KR | 10-2011-0112716 A | 10/2011 |
| KR | 10-2011-0126764 A | 11/2011 |
| KR | 10-2012-0006136 A | 1/2012 |

OTHER PUBLICATIONS

Supplementary European Search Report dated Apr. 17, 2015.

* cited by examiner

BATTERY CELL OF IMPROVED COOLING EFFICIENCY

CROSS REFERENCE TO RELATED APPLICATIONS

This application is a Continuation of PCT International Application No. PCT/KR2013/005163, filed on Jun. 12, 2013, which claims priority under 35 U.S.C. 119(a) to Patent Application No. 10-2012-0062397, filed in the Republic of Korea on Jun. 12, 2012, all of which are hereby expressly incorporated by reference into the present application.

TECHNICAL FIELD

The present invention relates to a battery cell of improved cooling efficiency and, more particularly, to a battery cell configured such that at least one electrode assembly of a structure having a cathode, an anode, and a separator interposed between the cathode and the anode is mounted in a battery case, at least one heat dissipation member to dissipate heat generated in the electrode assembly during charge and discharge of the battery cell or upon occurrence of a short circuit is disposed in the electrode assembly and/or is in contact with an outer surface of the electrode assembly, and a portion of the heat dissipation member is exposed outward from the electrode assembly.

BACKGROUND ART

Recently, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to each other because high output and large capacity are necessary for the middle or large-sized devices.

Preferably, a middle or large-sized battery module is manufactured so as to have as small a size and weight as possible. For this reason, a prismatic battery or a pouch-shaped battery, which can be stacked with high integration and has a small weight to capacity ratio, is usually used as a battery cell (unit battery) of the middle or large-sized battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

Battery cells constituting such a middle or large-sized battery module may be secondary batteries which can be charged and discharged. As heat is generated from the batteries due to internal resistance of the batteries during charge and discharge of the batteries, temperature of the batteries increases. In particular, during discharge of the batteries, a larger amount of heat is generated from the batteries due to heat caused by exothermic reaction in the batteries with the result that temperature of the batteries further increases. With increase in temperature of the batteries, lifespan characteristics of the batteries are deteriorated and gas is generated due to negative reaction. For these reasons, it is very important to cool the batteries.

Furthermore, the laminate sheet of each pouch-shaped battery widely used in the battery module has a polymer material exhibiting low thermal conductivity coated on the surface thereof with the result that it is difficult to effectively lower overall temperature of the battery cells.

Particularly, in a case in which high current is used to provide high output as in an electric vehicle, an amount of heat generated from the batteries further increases. If the heat, generated from the battery module during charge and discharge of the battery module, is not effectively removed from the battery module, the heat accumulates in the battery module with the result that deterioration of the battery module is accelerated. According to circumstances, the battery module may catch fire or explode. For this reason, a battery pack, which is a high-output, large-capacity battery, needs a cooling system to cool battery cells mounted therein.

In recent years, the capacity of an individual battery has been increased to increase overall capacity of a battery pack and reduce cost of the battery pack. As a result, generation of heat from the battery becomes serious.

In order to solve the above problem, a direct air cooling method, which is ineffective, an indirect air cooling method using a heat dissipation plate which exhibits high efficiency but incurs much cost, and a water cooling method to perform cooling using a coolant flowing through a water flow channel formed in a heat dissipation plate.

In a case in which a method performed based on heat transfer to the outside of the battery through convection or conduction is used, however, it is not easy for heat generated from the middle of the battery cell to be transferred to the heat dissipation plate disposed at the outside of the battery cell if the thickness of the battery is increased with the result that it is not possible to uniformly lower overall temperature of the battery cell.

In order to solve the above problem, it is necessary to manufacture a cooling system, which involves great cost. As a result, manufacturing cost of the battery pack is increased.

In addition, when an internal short circuit occurs due to penetration of a needle type conductor into the battery, it is not possible to uniformly restrain the increase in temperature of the battery. Furthermore, the strength of the battery against external impact is low with the result that it is difficult to secure safety of the battery.

Consequently, there is a high necessity for a battery cell that is capable of efficiently removing heat generated from the battery cell during charge and discharge of the battery cell while providing high-output, large-capacity power and that is capable of more efficiently performing a cooling process when an internal short circuit occurs doe to external impact and penetration of a needle type conductor into the battery cell, whereby safety and lifespan characteristics of the battery cell are improved.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present application have found that, in a case in which a battery cell is manufactured such that a heat dissipation member is disposed in an electrode assembly and/or is in contact with an outer surface of the electrode assembly and a portion of the heat dissipation member is exposed outward from the electrode assembly, it is possible to effectively discharge heat generated from the electrode assembly from the battery cell, thereby improving lifespan characteristics of the battery cell with low cost.

Therefore, it is an object of the present invention to provide a battery cell that is capable of effectively discharging heat generated from an electrode assembly from the battery cell, whereby lifespan characteristics of the battery cell are improved.

It is another object of the present invention to provide a battery cell that is capable of effectively discharge heat from the battery cell even when an internal short circuit occurs due to penetration of a needle type conductor into the battery cell, whereby the increase in temperature of the battery cell is maximally restrained and the strength of the battery against external impact is high.

It is a further object of the present invention to provide a battery module or a battery pack, cooling efficiency of which is maximized using the battery cell.

Technical Solution

In accordance with one aspect of the present invention, the above and other objects can be accomplished by the provision of a battery cell configured such that at least one electrode assembly of a structure having a cathode, an anode, and a separator interposed between the cathode and the anode is mounted in a battery case, at least one heat dissipation member to dissipate heat generated in the electrode assembly during charge and discharge of the battery cell or upon occurrence of a short circuit is disposed in the electrode assembly and/or is in contact with an outer surface of the electrode assembly, and a portion of the heat dissipation member is exposed outward from the electrode assembly.

As previously described, the heat dissipation member is disposed in the battery cell according to the present invention. Specifically, a metal heat dissipation member that is capable of performing direct heat conduction is disposed in the battery cell. Consequently, it is possible to improve heat dissipation as compared with a conventional method of transferring heat to an outside of a battery cell via an outer surface of the battery cell, which is inefficient.

In addition, a portion of the heat dissipation member is disposed in the electrode assembly. When an internal short circuit occurs due to penetration of a needle type conductor into the battery cell, therefore, it is possible to maximally restrain the increase in temperature of the battery cell. Furthermore, it is possible to improve strength of the battery cell as compared with a conventional battery cell only including a battery case. As a result, it is possible to further improve safety of the battery cell.

In a preferred example, the heat dissipation member may be configured to have a plate-shaped structure in which the heat dissipation member is disposed in the electrode assembly and/or is in contact with the outer surface of the electrode assembly.

The electrode assembly mounted in a receiving part of the battery case is not particularly restricted so long as the electrode assembly is configured to have a structure including a cathode formed by interconnecting a plurality of electrode tabs, an anode formed by interconnecting a plurality of electrode tabs, and a separator interposed between the cathode and the anode. Preferably, the electrode assembly is configured to have a wound type (jelly-roll), stacked type, or stacked/folded type structure. The details of the stacked/folded type electrode assembly are disclosed in Korean Patent Application Publication No. 2001-0082058, No. 2001-0082059, and No. 2001-0082060, which have been filed in the name of the applicant of the present patent application. The disclosures of the above patent publications are hereby incorporated by reference as if fully set forth therein.

For the jelly-roll, the heat dissipation member may be mounted at a wound center portion thereof. The heat dissipation member may be mounted at the wound center portion of the jelly-roll during winding. Alternatively, winding may be performed using a mandrel and the heat dissipation member may be inserted into the jelly-roll after the mandrel is removed.

According to circumstances, the battery cell may include two or more electrode assemblies. In this case, the heat dissipation member may be disposed at an interface between the electrode assemblies. In a case in which the heat dissipation member contacts the interface between the electrode assemblies, heat generated in the battery cell during charge and discharge of the battery cell may be removed via the heat dissipation member. A process of mounting the heat dissipation member at the interface between the electrode assemblies is very easy.

In a case in which the battery cell includes two or more jelly-rolls, the heat dissipation member may be mounted at an interface between the jelly-rolls.

Heat dissipation efficiency of the heat dissipation member is affected by surface area of the heat dissipation member contacting the electrode assembly. For example, the heat dissipation member may have a thickness equivalent to about 0.1 to 20% the total thickness of the electrode assembly. In addition, the heat dissipation member may have a size equivalent to 50% or more the width of the electrode assembly. If the size of the heat dissipation member is too small, heat generated from the battery cell may not be sufficiently transferred to the heat dissipation member, which is not preferable. On the other hand, if the size of the heat dissipation member is too large, the total size of the battery cell is increased, which is not preferable. However, the size of the heat dissipation member is not necessarily limited to the above-defined range.

As previously described, a portion of the heat dissipation member is exposed outward from the electrode assembly to improve heat dissipation efficiency. The exposed portion of the heat dissipation member may have a size equivalent to 1 to 50%, preferably 5 to 40%, more preferably 10 to 30%, the total size of the heat dissipation member. The size of the exposed portion of the heat dissipation member may be set based on the electrode assembly. For example, the exposed portion of the heat dissipation member may have a size equivalent to 2 to 30% the plane area of the electrode assembly.

In a preferred example, at least one side end of the heat dissipation member may be in contact with the battery case. In a case in which one side end of the heat dissipation member contacts the battery case, heat generated in the battery cell is dissipated via the battery case, thereby efficiently achieving heat dissipation.

This structure is preferably applied to a cylindrical battery cell using a cylindrical container made of a metal material as the battery case or a prismatic battery cell using a prismatic container made of a metal material as the battery case.

In another preferred example, at least one side end of the heat dissipation member may extend outward from the battery case via the battery case.

In a case in which the at least one side end of the heat dissipation member extends outward from the battery case, heat generated in the battery cell during charge and discharge of the battery cell is transferred to the outside of the battery cell via the heat dissipation member, thereby achieving more efficiency cooling. This structure is preferably used in a case in which the battery case is formed of a material exhibiting somewhat low thermal conductivity or is configured to have a structure having somewhat low thermal conductivity.

For example, in a case in which the battery case is formed of a laminate sheet including a resin layer and a metal layer, the laminate sheet has a polymer material exhibiting low thermal conductivity coated on the surface thereof with the result that it is difficult to effectively lower overall temperature of the battery cell. In the structure in which the at least one side end of the heat dissipation member extends outward from the battery case as described above, on the other hand, it is possible to solve the above-mentioned cooling problem.

In this case, the laminate sheet may be thermally welded in a state in which the at least one side end of the heat dissipation member is disposed in the laminate sheet. Specifically, the laminate sheet including the resin layer and the metal layer and an additional sheet separated from the laminate sheet or extending from the laminate sheet may be thermally welded with each other in a state in which the electrode assembly is mounted in a receiving part of a pouch-shaped case formed of the laminate sheet, for example an aluminum laminate sheet, and at least one side end of the heat dissipation member is disposed between the respective sheets.

As previously described, a portion of the heat dissipation member exposed outward from the battery case is at least one side end of the heat dissipation member. For example, in a case in which the heat dissipation member is formed in a quadrangular shape on plane, one side edge, two side edges, three side edges, or four side edges may be exposed. Alternatively, the entirety or a portion of each side edge may be exposed.

Preferably, at least one side end of the heat dissipation member may extend outward from a side of the battery case opposite to another side of the battery case at which electrode terminals are located or from a side of the battery case adjacent to another side of the battery case at which electrode terminals are located.

Specifically, the heat dissipation member disposed at the interface between the electrode assemblies may be located opposite to the electrode terminals for charging and discharging or located adjacent to the electrode terminals for charging and discharging. In this structure, the occurrence of a short circuit is prevented.

The material for the heat dissipation member is not particularly restricted so long as the heat dissipation member is formed of a thermally conductive material. For example, the heat dissipation member may be formed of a metal material exhibiting high thermal conductivity.

The size of the portion of the heat dissipation member exposed outward from the battery case is not particularly restricted. Particularly, in a case in which an additional member or device is added to the heat dissipation member in order to maximize cooling characteristics of the heat dissipation member, the size of the portion of the heat dissipation member exposed outward from the battery case may be greater than that of the portion of the heat dissipation member disposed in the battery cell.

In accordance with another aspect of the present invention, there is provided a battery module including two or more battery cells with the above-stated construction.

In a preferred example, the battery module may further include a heat exchange member, wherein a heat dissipation member protruding outward from the respective battery cells may be in contact with the heat exchange member. Heat transfer is efficiency achieved through such a combination of the heat dissipation member and the heat exchange member. Contact between the heat dissipation member and the heat exchange member may be achieved using various methods, such as welding and mechanical fastening.

The structure of the heat exchange member is not particularly restricted. Preferably, the heat exchange member is provided with one or more flow channels through which a coolant flows. For example, in a case in which a coolant flow channel, through which a liquid coolant such as water flows, is formed at the heat exchange member, it is possible to achieve an excellent cooling effect with high reliability as compared with a conventional air cooling structure.

Specifically, the heat exchange member may be configured to have a structure including a base part in tight contact with the heat dissipation member, opposite side parts connected to the base part, the opposite side parts having coolant flow channels formed therethrough in a longitudinal direction thereof and a plurality of heat dissipation fins disposed between the opposite side parts in a state in which the heat dissipation fins extend upward from the base part.

Consequently, heat, transferred from the battery cells to the heat dissipation member, is conducted to the bottom of the base part of the heat exchange member and is removed through a water cooling structure based on the coolant flow channels formed through the opposite side parts of the heat exchange member and through an air cooling structure based on the heat dissipation fins, thereby effectively achieving dissipation of heat from the battery cells.

Alternatively, the coolant flow channels may not be formed at the heat exchange member to achieve dissipation of heat from the battery cells based only on the air cooling structure.

In accordance with a further aspect of the present invention, there are provided a battery pack manufacturing by combining one or more battery modules based on output and capacity and a device including the battery pack.

The device according to the present invention may include a plurality of battery packs in order to provide high output and large capacity. The battery pack according to the present invention are preferably used as a power source for an electric vehicle, a hybrid electric vehicle, a plug-in hybrid electric vehicle, or a power storage device in which high-temperature heat generated during charge and discharge of the battery pack is a serious safety concern.

Particularly, high heat dissipation is necessary for an electric vehicle and a plug-in hybrid electric vehicle requiring high output from a battery pack for a long time. In this case, the battery pack according to the present invention is preferably used in such an electric vehicle and a plug-in hybrid electric vehicle.

The structures and manufacturing methods of the battery module, the battery pack, and the device as described above are well known in the art using battery cells and, therefore, a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
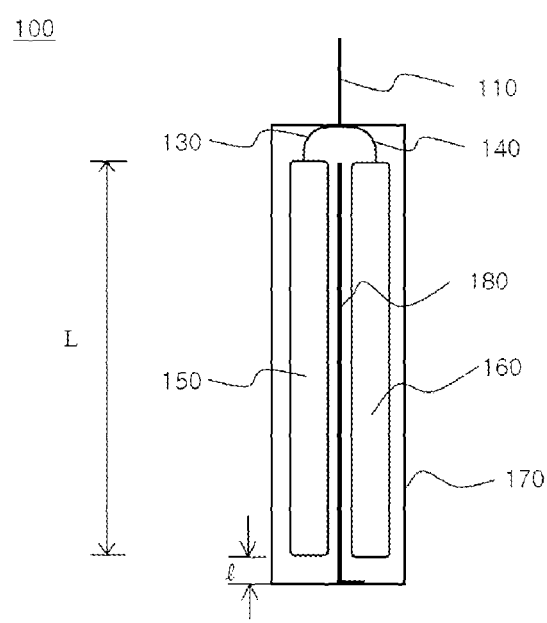
FIG. 1 is a typical view showing the interior of a battery cell in which a heat dissipation member according to an embodiment of the present invention is interposed between electrode assemblies.

FIG. 1 typically shows the interior of a battery cell in which a heat dissipation member according to an embodiment of the present invention is interposed between electrode assemblies.

Referring to FIG. 1, a battery cell 100 includes two or more electrode assemblies 150 and 160, electrode tabs 130 and 140 extending from the respective electrode assemblies 150 and 160, an electrode lead 110 welded to the electrode tabs 130 and 140, a heat dissipation member 180 interposed between the electrode assemblies 150 and 160, and a battery case 170 covering outer surfaces of the electrode assemblies 150 and 160 including the electrode tabs 130 and 140 and the heat dissipation member 180. The battery case 170 is formed of a prismatic metal container.

At least one side end of the heat dissipation member 180 is exposed outward from the electrode assemblies 150 and 160. The exposed size l of the heat dissipation member 180 is about 10% the total size L of each of the electrode assemblies 150 and 160.

Furthermore, the exposed heat dissipation member 180 contacts the inside of the battery case 170. To this end, one side end of the heat dissipation member 180 exposed outward from the electrode assemblies is bent to increase contact area between the exposed end of the heat dissipation member 180 and the battery case 170. Consequently, the exposed end of the heat dissipation member 180 contacts the battery case 170 with the result that heat generated in the battery cell is dissipated outward via the battery case 170, thereby efficiently achieving heat dissipation.

In addition, the heat dissipation member 180 is disposed at the interface between the electrode assemblies. Consequently, heat generated in the battery cell is more efficiently conducted to the heat dissipation member 180 and is dissipated outward through one side end of the heat dissipation member 180.

Generally, heat generated from the electrode assemblies is discharged outward through the battery case. When heat is generated from the electrode assemblies, therefore, inside temperature of each of the electrode assemblies is higher than outside temperature of each of the electrode assemblies. For this reason, the two electrode assemblies are mounted in the battery case and the heat dissipation member is interposed between the electrode assemblies to effectively remove heat from inside portions of the electrode assemblies which are not adjacent to the battery case.

Figure 2:
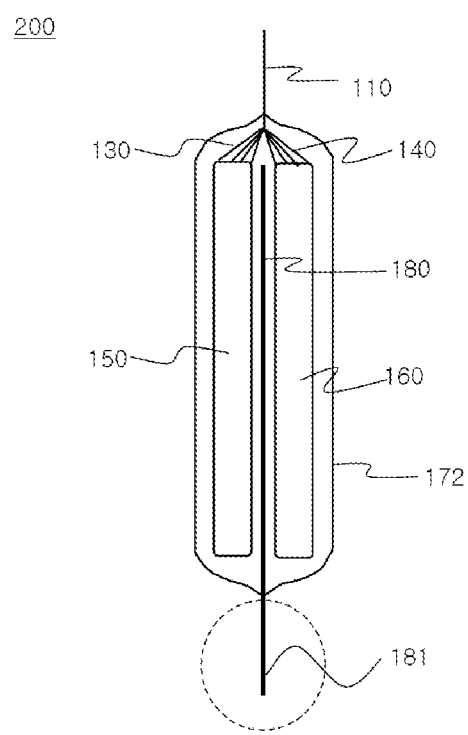
FIG. 2 is a typical view showing the interior of a battery cell in which a heat dissipation member according to another embodiment of the present invention is interposed between electrode assemblies.
Figure 3:
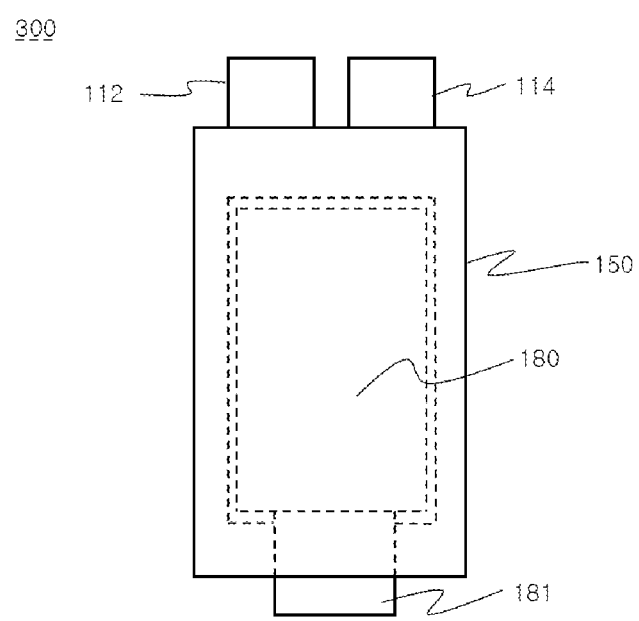
FIG. 3 is a plan view of FIG. 2.

FIG. 2 typically shows the interior of a battery cell in which a heat dissipation member according to another embodiment of the present invention is interposed between electrode assemblies and FIG. 3 is a plan view of FIG. 2.

Referring to FIGS. 2 and 3, one side end 181 of a heat dissipation member 180 extends outward from a battery case 172. The battery case 172 is formed of a laminate sheet including a metal layer and a resin layer. The laminate sheet is thermally welded such that a portion of the heat dissipation member 180 is exposed outward from the battery case 172 in a state in which the heat dissipation member 180 is disposed in the battery case 172 to constitute a battery cell 200. For example, stacked type or stacked/folded type electrode assemblies 150 and 160 are mounted in the battery case 172.

Consequently, heat generated in the battery cell during charge and discharge of the battery cell is transferred outward from the battery cell via the heat dissipation member 180, thereby achieving more efficient cooling. That is, a portion of the heat dissipation member 180 is exposed outward from the battery case 170 not only to dissipate heat generated during charge and discharge of the battery cell under normal conditions but also to greatly restrain abrupt increase of temperature due to an internal short circuit during a needle penetration test. Furthermore, rigidity of the battery cell is improved as a result of the increase in mechanical strength of the electrode assemblies 150 and 160.

The side end 181 of a heat dissipation member 180 extends outward from a side of the battery case opposite to another side of the battery case at which electrode terminals 112 and 114 are located to prevent the occurrence of a short circuit.

Figure 4:
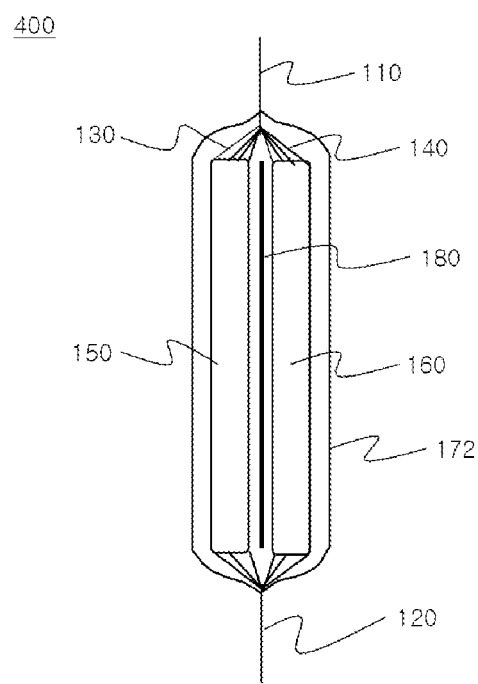
FIG. 4 is a typical view showing the interior of a battery cell in which a heat dissipation member according to a further embodiment of the present invention is interposed between electrode assemblies.
Figure 5:
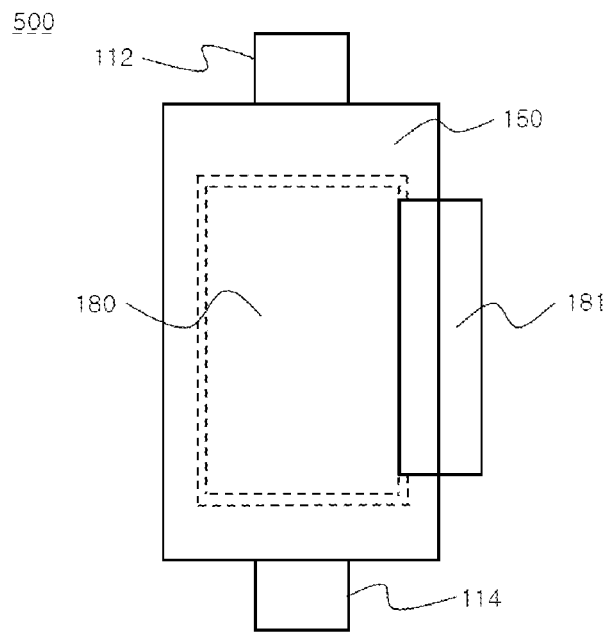
FIG. 5 is a plan view of FIG. 4.

FIG. 4 typically shows the interior of a battery cell in which a heat dissipation member according to a further embodiment of the present invention is interposed between electrode assemblies and FIG. 5 is a plan view of FIG. 4.

Referring to FIGS. 4 and 5, at least one side end 181 of a heat dissipation member 180 extends outward from a side of a battery case adjacent to ends of the battery case at which electrode terminals 112 and 114 are located. The side end 181 of the heat dissipation member 180 extends outward from the battery case 172. Consequently, heat generated in the battery cell during charge and discharge of the battery cell is transferred outward from the battery cell via the heat dissipation member 180, thereby achieving more efficient cooling.

Figure 6:
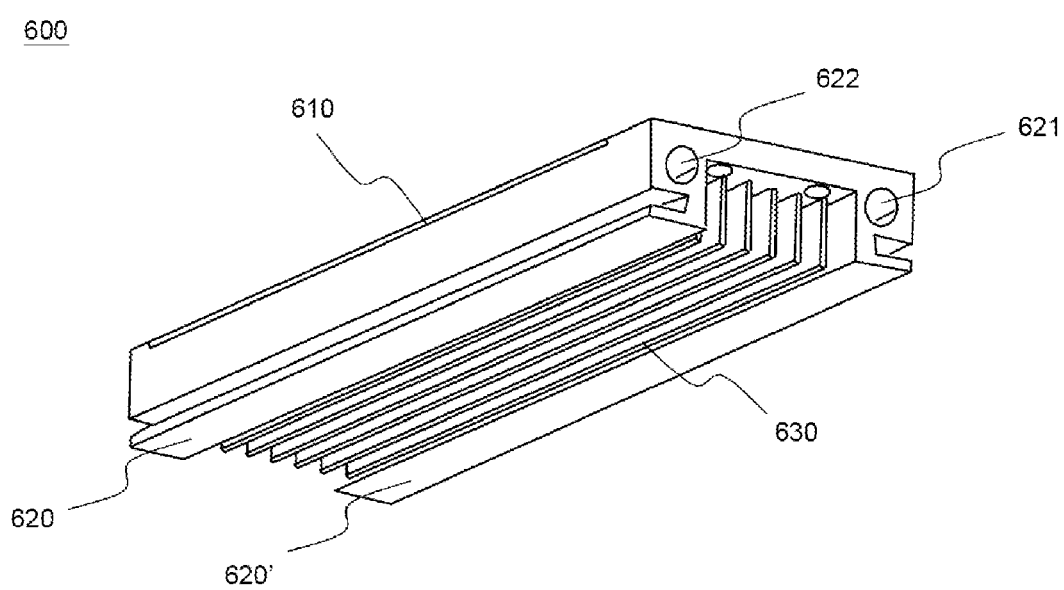
FIG. 6 is a typical view showing an exemplary heat exchange member.
Figure 7:
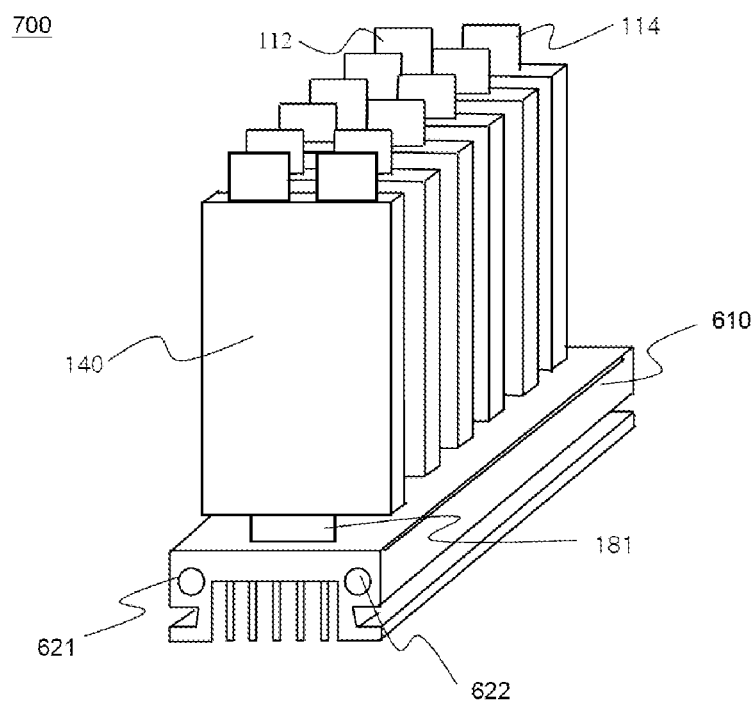
FIG. 7 is a typical view showing the structure of a battery pack according to an embodiment of the present invention.

FIG. 6 typically shows an exemplary heat exchange member which may be used in the present invention and FIG. 7 typically shows the structure of a battery pack in which a heat exchange member is connected to heat dissipation members according to an embodiment of the present invention.

Referring to FIGS. 6 and a battery pack 700 is configured to have a structure in which a plurality of battery cells 200 is stacked such that the battery cells 200 face each other in a lateral direction and a heat exchange member 600 is disposed at one side end 181 of each heat dissipation member exposed outward from a side of a corresponding battery case opposite to another side of the battery case at which electrode terminals 112 and 114 are located.

The heat exchange member 600 is configured to have a structure including a base part 610 connected to the side ends 181 of the heat dissipation members protruding outward from the respective battery cells in a state in which the base part 610 is in tight contact with bottoms of the side ends 181 of the heat dissipation members, opposite side parts 620 and 620' connected to the base part 610, the opposite side parts 620 and 620' having coolant flow channels 621 and 622 formed therethrough in a longitudinal direction thereof, and a plurality of heat dissipation fins 630 disposed between the opposite side parts 620 and 620' in a state in which the heat dissipation fins 630 extend upward from the base part 610.

In the above structure as described above, the coolant flow channels 621 and 622 are provided such that a coolant, such as water, flows through the coolant flow channels 621 and 622 and the heat dissipation fins 630 are arranged at predetermined intervals D such that air can flow through spaces defined between the respective heat dissipation fins 630. Consequently, heat transferred from the heat dissipation members 180 may be removed with high reliability and excellent cooling efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

[Industrial Applicability]

As is apparent from the above description, a battery cell according to the present invention is configured such that a heat dissipation member to accelerate dissipation of heat from the battery cell is disposed in an electrode assembly and/or is exposed outward from the electrode assembly in a state in which the heat dissipation member is in contact with an outer surface of the electrode assembly. Consequently, heat generated in the battery cell is effectively discharged from the battery cell, thereby improving lifespan characteristics of the battery cell.

In addition, the heat dissipation member protruding outward from the battery cell is in contact with a heat exchange member. Consequently, a cooling structure is simplified and safety of a battery module or a battery pack is further improved.

The invention claimed is:

1. A battery cell configured such that at least one electrode assembly of a structure having a cathode, an anode, and a separator interposed between the cathode and the anode is mounted in a battery case, at least one heat dissipation member to dissipate heat generated in the electrode assembly during charge and discharge of the battery cell or upon occurrence of a short circuit is disposed in the electrode assembly and/or is in contact with an outer surface of the electrode assembly, and a portion of the heat dissipation member is exposed outward from the electrode assembly,
wherein at least one side end of the heat dissipation member is in surface-to-surface contact with the inside of the battery case, the at least one side end of the heat dissipation member exposed outward from the electrode assembly being bent, while the portion of the heat dissipation member exposed outward from the electrode assembly is not exposed outward from the battery case.

2. The battery cell according to claim 1, wherein the heat dissipation member is configured to have a plate-shaped structure.

3. The battery cell according to claim 1, wherein the electrode assembly is configured to have a jelly-roll.

4. The battery cell according to claim 1, wherein the electrode assembly is configured to have a stacked type or stacked/folded type structure.

5. The battery cell according to claim 3, wherein the heat dissipation member is mounted at a wound center portion of the jelly-roll.

6. The battery cell according to claim 1, wherein the battery cell comprises two or more electrode assemblies and the heat dissipation member is disposed at an interface between the electrode assemblies.

7. The battery cell according to claim 1, wherein the battery case is a cylindrical or prismatic case made of a metal material.

8. The battery cell according to claim 1, wherein the heat dissipation member is formed of a thermally conductive material.

9. The battery cell according to claim 1, wherein the heat dissipation member is formed of a metal material.

10. A battery module comprising two or more battery cells according to claim 1.

11. A battery pack comprising one or more battery modules according to claim 10 based on output and capacity.

12. A device comprising a battery pack according to claim 11.

13. The device according to claim 12, wherein the device is an electric vehicle, a hybrid electric vehicle, a plug-in hybrid electric vehicle, or a power storage device.

* * * * *